US008512135B2

(12) United States Patent
Anderson et al.

(10) Patent No.: US 8,512,135 B2
(45) Date of Patent: Aug. 20, 2013

(54) PROCESSING WAGERING GAME EVENTS

(75) Inventors: Peter R. Anderson, Glenview, IL (US); Mark E. Gagner, West Chicago, IL (US); Damon E. Gura, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 486 days.

(21) Appl. No.: 12/441,340

(22) PCT Filed: Sep. 11, 2007

(86) PCT No.: PCT/US2007/078210

§ 371 (c)(1), (2), (4) Date: May 29, 2009

(87) PCT Pub. No.: WO2008/033877

PCT Pub. Date: Mar. 20, 2008

(65) Prior Publication Data

US 2009/0275377 A1 Nov. 5, 2009

Related U.S. Application Data

(60) Provisional application No. 60/845,097, filed on Sep. 15, 2006.

(51) Int. Cl.
*A63F 9/24* (2006.01)
*A63F 13/00* (2006.01)

(52) U.S. Cl.
USPC .......... 463/29

(58) Field of Classification Search
USPC .......... 463/29
See application file for complete search history.

(56) References Cited

U.S. PATENT DOCUMENTS

| | | | | |
|---|---|---|---|---|
| 5,573,244 | A | 11/1996 | Mindes | |
| 5,842,921 | A | 12/1998 | Mindes et al. | |
| 6,846,238 | B2 | 1/2005 | Wells | |
| 6,918,831 | B2 | 7/2005 | Nguyen et al. | |
| 7,048,629 | B2 * | 5/2006 | Sines et al. | 463/16 |
| 2001/0046893 | A1 | 11/2001 | Giobbi et al. | |
| 2003/0003997 | A1 * | 1/2003 | Vuong et al. | 463/42 |
| 2003/0064805 | A1 | 4/2003 | Wells | |
| 2004/0147314 | A1 | 7/2004 | LeMay et al. | |
| 2005/0193209 | A1 | 9/2005 | Saunders et al. | |
| 2006/0178188 | A1 | 8/2006 | LeMay et al. | |
| 2007/0202941 | A1 | 8/2007 | Miltenberger et al. | |
| 2008/0039207 | A1 | 2/2008 | Hutchinson-Kay | |
| 2008/0045289 | A1 | 2/2008 | Odom et al. | |
| 2010/0190554 | A1 | 7/2010 | Gagner et al. | |

OTHER PUBLICATIONS

"PCT Application No. PCT/US2007/078210 International Preliminary Report on Patentability", Mar. 9, 2009 , 10 pages.

(Continued)

*Primary Examiner* — William D Coleman
(74) *Attorney, Agent, or Firm* — DeLizio Gilliam, PLLC

(57) ABSTRACT

Systems for processing wagering game events are described herein. In one embodiment, a wagering game machine comprises a plurality of input devices configured to generate events. The apparatus can also include an event handler configured to detect the events, to cause persistent storage of the events, and to transmit the events. The apparatus can also include a wagering game controller configured to receive the events from the event handler and to present and replay wagering games using the events.

14 Claims, 8 Drawing Sheets

(56) References Cited

OTHER PUBLICATIONS

"PCT Application No. PCT/US2007/078210 International Search Report", Jun. 5, 2008 , 7 pages.
"PCT Application No. PCT/US2008/71856 International Search Report", Jan. 2, 2009 , 9 pages.
"PCT Application No. PCT/US2008/71856 International Preliminary Report on Patentability", Aug. 5, 2010 , 11 pages.
"U.S. Appl. No. 12/670,818 Office Action", Oct. 31, 2011 , 20 pages.
"U.S. Appl. No. 12/670,818 Office Action", Aug. 3, 2012 , 23 pages.

* cited by examiner

PROCESSING WAGERING GAME EVENTS

RELATED APPLICATIONS

This application claims the priority benefit of U.S. Provisional Application Ser. No. 60/845,097 filed Sep. 15, 2006.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, WMS Gaming, Inc.

FIELD

Embodiments of the inventive subject matter relate generally to wagering game systems, and more particularly, to wagering game systems that record and process events.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a wagering game machine comprises a plurality of input devices configured to generate events, an event handler configured to detect the events, to cause persistent storage of the events, and to transmit the events, and a wagering game controller configured to receive the events from the event handler and to present and replay wagering games using the events. In some embodiments, the events represent one or more of the following: player input, intermediate results for the wagering game, and final results for the wagering game. In some embodiments, the events are stored in a current event store. In some embodiments, the event handler is further configured to copy the events from the current event store to an event history and to delete the events from the current event store. In some embodiments, the wagering game is configured to replay the wagering game as part of one or more of power recovery, dispute resolution, attract mode media presentation, data mining, and features of the wagering game. In some embodiments, the events are remotely stored separate from the wagering game machine. In some embodiments, the event handler is further configured to determine whether the event is relevant to the wagering game.

In some embodiments, a machine-readable medium includes instructions executable by a machine, the instructions including: 1) instructions to determine that a wagering game should be replayed; 2) instructions to receive events associated with the wagering game; 3) instructions to move the wagering game between different states based on the events; and 4) instructions to present video content associated with the different states. In some embodiments, the events were generated during a past presentation of the wagering game. In some embodiments, the instructions to present video content include instructions to resize the video content to fit in areas of a replay interface. In some embodiments, the events do not include video content. In some embodiments, the wagering game is selected from die group consisting of a wagering game with a large payout, a wagering game associated with a player dispute, and a wagering game being analyzed for efficiency. In some embodiments, the instructions to present video content include instructions to control the video content through a replay interface, where the control includes one or more of play, fast forward, slow motion, and rewind.

In some embodiments, a method comprises the following: 1) entering an initial state of a wagering game; 2) determining whether there are any events stored in a current event set; 3) if there are events stored in the current event set, restoring the wagering game to a previous state by processing the events stored in the current event set; 4) detecting a new event associated with the wagering game; 5) storing the new event in the current event set; and 6) progressing the wagering game to another state based on the new event. In some embodiments, the event is selected from the group consisting of a button press indication, a touchscreen indication, a coin input, a dollar input, a card reader input, a random number generation, and a calculation. In some embodiments, the current event set is stored in persistent storage. In some embodiments, determining that there are events stored in the current event set indicates that a power recovery operation is taking place. In some embodiments, the method of claim 14, wherein the previous state is a state in which the wagering game was interrupted. In some embodiments, the method further includes determining that the wagering game has reached a state where the current event state should be cleared, and clearing the current event set. In some embodiments, the state in which the current event set should be cleared is an end of the wagering game. In some embodiments, the method further comprises copying events of the current event set to an event history.

BRIEF DESCRIPTION OF THE FIGURES

The present invention is illustrated by way of example and not limitation in the Figures of the accompanying drawings in which.

DESCRIPTION OF THE EMBODIMENTS

This description of the embodiments is divided into five sections. The first section provides an introduction to embodiments of the invention, while the second section describes example wagering game machine architectures. The third section describes example operations performed by some embodiments and the fourth section describes example wagering game machines in more detail. The fifth section presents some general comments.

Introduction

This section provides an introduction to some embodiments of the invention. Some embodiments include wagering game machines that can record and process events in the course of presenting wagering games. The events can represent player inputs (e.g., button presses), machine-generated responses (e.g., timers expiring, completion of animations, etc.), and other occurrences in a wagering game system. For example, when a player presses a machine's "spin reels" button, the machine can generate and record an event. The machine can first process the event as part of presenting a wagering game (e.g., slots). Later, the machine can use recorded events to replay past games—much like "instant replays" shown during televised sporting events. In some embodiments, the replay functionality requires very little extra logic because machines use the same components for both conducting and replaying games. As a result, some embodiments can replay games without much additional program code and with no additional media files (e.g., mpeg files, jpeg files, etc.).

Embodiments enable wagering game machines to replay past games in many different scenarios. Some embodiments can replay games to solve player disputes. For example, if a player dispute arises, a machine can process recorded events to replay the wagering game exactly as it occurred. Replaying games allows players and machine operators to see how games transpired and resolve disputes accordingly. Machines may also replay past games to cultivate player interest. For example, a bank of machines may process recorded events to replay past games for which big jackpots were awarded. Replaying large jackpot games may give winners a feeling of accomplishment and attract players to a particular bank of machines.

In addition to replaying games, embodiments can process recorded events to recover from power failures and other anomalies. For example, if a machine looses power during a wagering game, the machine can use recorded events to determine the machine's state before power was lost. The discussion of FIG. 1 describes some of these features.

Figure 1:
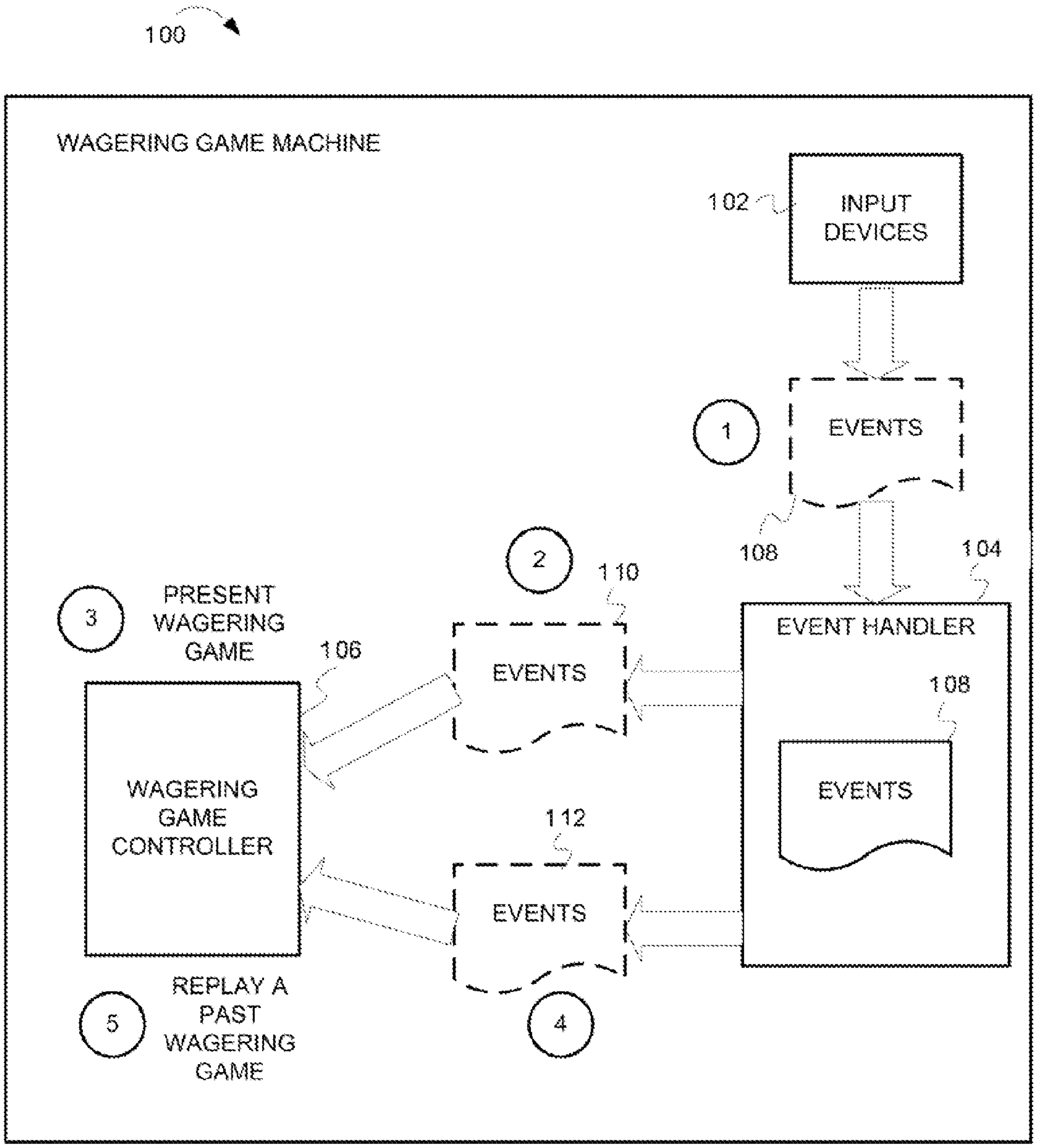
FIG. 1 is a dataflow diagram illustrating dataflow and operations associated with processing and recording events in a wagering game machine, according to example embodiments of the invention.

FIG. 1 is a dataflow diagram illustrating dataflow and operations associated with processing and recording events in a wagering game machine, according to example embodiments of the invention. In FIG. 1, the wagering game machine 100 includes input devices 102 (e.g., buttons, touchscreen, etc.), an event handler 104, and a wagering game controller 106.

Stages 1-3 depict dataflow and operations for conducting a wagering game, whereas stages 4 & 5 show dataflow and operations for replaying a wagering game. During stage 1, the input devices 102 detect input, such as button presses, screen touches, or the like. Based on the inputs, the input devices 102 generate events 108 and transmit them to the event handler 104, which stores them in a persistent data store (e.g., a database). During stage 2, the event handler 104 provides a copy of the events 110 to the wagering game controller 106. In some embodiments, the event handler 104 provides only relevant events to the controller 106. That is, the event handler 104 can ignore events that are not relevant to the wagering game. For example, the event handler 104 can ignore touchscreen input associated with touchscreen areas that are not defined for input.

During stage 3, the wagering game controller 106 presents a wagering game based on the events 110. For example, the wagering game controller 106 presents audio and video representing results for the wagering game. In some instances, the machine 100 may perform stages 1-3 several times before the wagering game is complete. After the wagering game is over (i.e., after stage 3), the wagering game machine 100 can replay the wagering game. To replay the game, at stage 4, the event handler 104 transmits a copy 112 of the persistently stored events 108 to the controller 106. At stage 5, the controller 106 presents a replay of the wagering game based on the events 112.

In addition to replaying wagering games, the wagering game machine 100 can use the persistently stored events 108 to restore wagering games that are interrupted by power loss or other anomalies. Although FIG. 1 describes some embodiments, the following sections describe many other features and embodiments.

Wagering Game Machine Architectures

Figure 2:
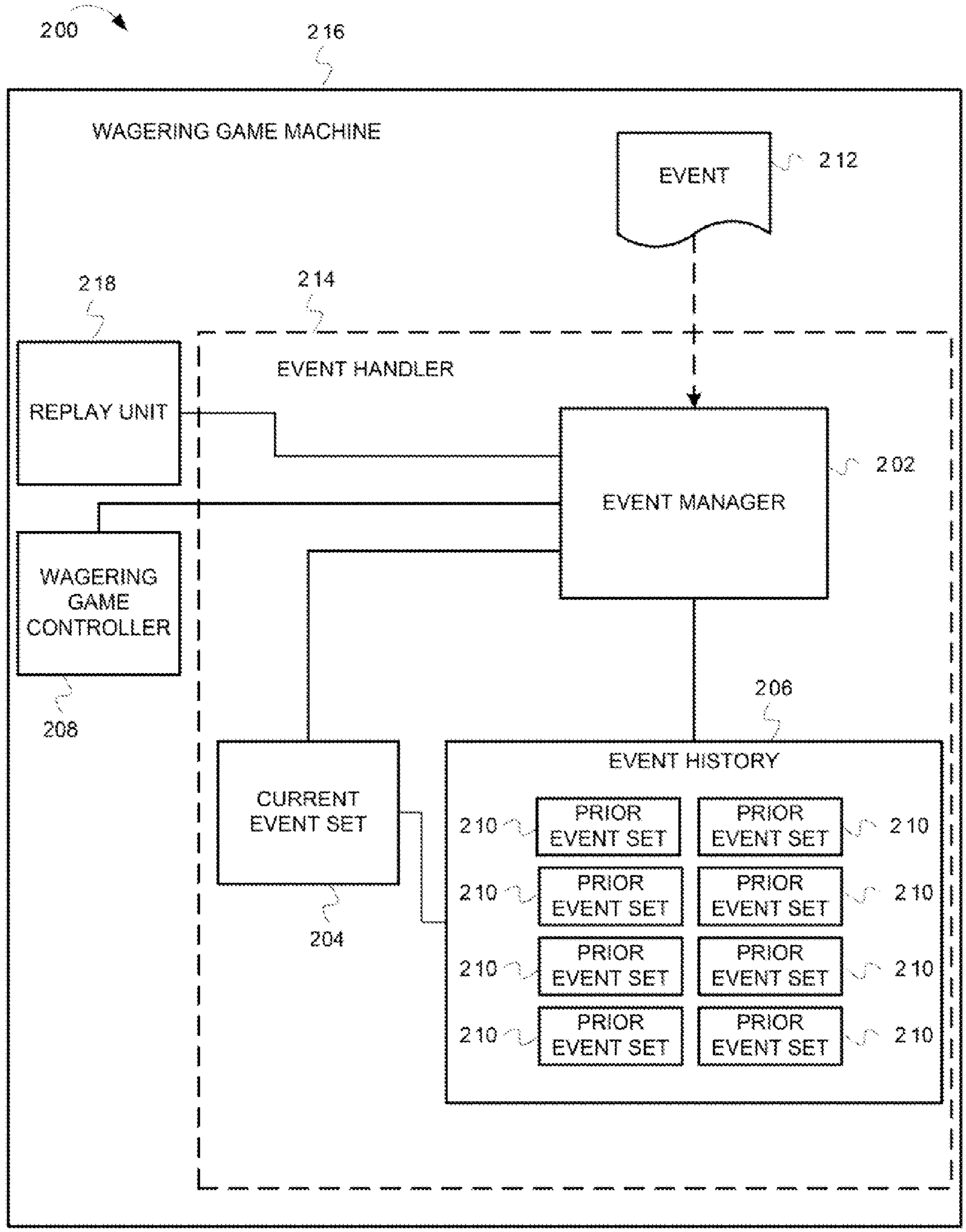
FIG. 2 is a block diagram illustrating a wagering game machine architecture suited for recording and processing wagering game events, according to example embodiments of the invention.
Figure 3:
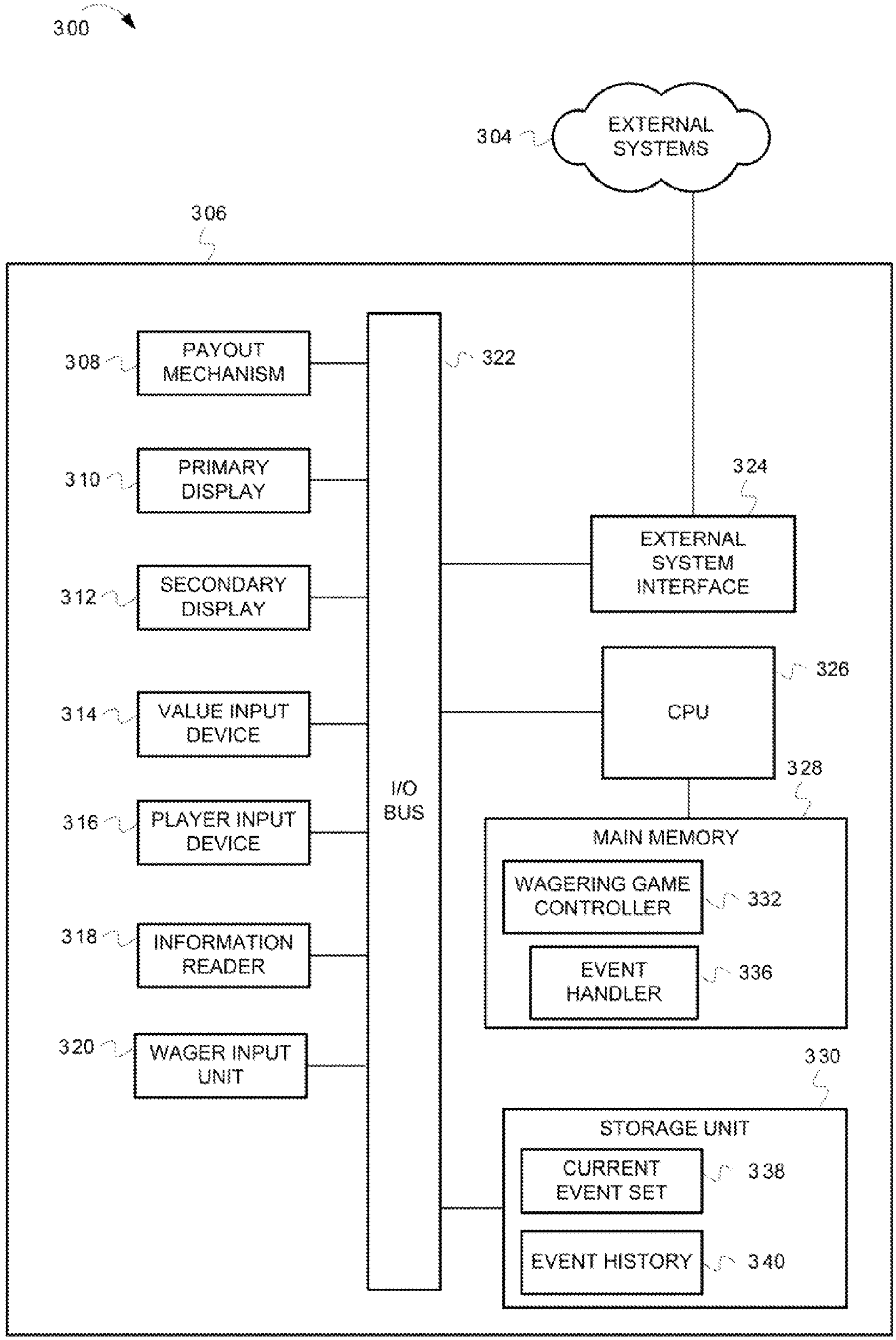
FIG. 3 is a block diagram illustrating another wagering game machine architecture suited for recording and processing wagering game events, according to example embodiments of the invention.

This section presents FIGS. 2 and 3, which describe example wagering game machine architectures suitable for persistently storing events and replaying wagering games. This section continues with a discussion of FIG. 2.

FIG. 2 is a block diagram illustrating a wagering game machine architecture suited for recording and processing wagering game events, according to example embodiments of the invention. In FIG. 2, the architecture 200 includes a wagering game machine 216, which includes an event handler 214, wagering game controller 208, and replay unit 218. The event handler 214 includes an event manager 202 that is connected to a current event set 204 and event history 206.

The event manager 202 can receive events 212 from components inside or outside the wagering game machine 216. For example, the event manager 202 can receive events 212 from I/O devices (not shown), the wagering game controller 208, and other components of the machine 216. Additionally, the event manager 202 can receive events 212 from gaming components located on a network or from devices otherwise connected to the machine 216. The events 212 can represent player inputs, machine-generated data (e.g., intermediate game results, final game results, etc.), and/or any other suitable information useful in presenting and/or replaying wagering games.

The current event set 204 can persistently store events received in association with a current wagering game (i.e., a wagering game being conducted at a given time). The event manager 202 can provide events from the current event set 204 to the wagering game controller 208 as part of a process for conducting a wagering game. After the current wagering game is over, the event manager 202 can persistently store the contents of the current event set 204 as a prior event set 210 in the event history 206. The prior event sets 210 can include event sets for any games of interest, such as games in which high jackpots were awarded, games thought to be particularly entertaining, recently concluded games (e.g., the most recent 20 games), etc. The replay unit 218 can use the prior event sets 210 to replay wagering games, as described in greater detail below (see discussion of FIGS. 6 and 7).

Although FIG. 2 shows an embodiment in which the current event set 204 and event history 206 reside in a wagering game machine 216, other embodiments can store the current event set 204 and/or the event history 206 on remote devices. For example, the current event set 204 and/or the event history 206 can be stored on a remote wagering game server or other network device.

This section continues by describing another architecture.

FIG. 3 is a block diagram illustrating another wagering game machine architecture suited for recording and processing wagering game events, according to example embodiments of the invention. As shown in FIG. 3, the wagering game machine 306 includes a central processing unit (CPU) 326 connected to main memory 328, which includes a wagering game controller 332 and an event handler 336. The wagering game controller 332 can conduct wagering games (e.g., video poker, video blackjack, video slots, video lottery, etc.) in whole or part. In one embodiment, the event handler 336 can receive events from any of the components in the machine 306. Additionally, the event handler 336 can persistently store events in a current event set 338 and an event history 340, both of which reside in a storage unit 330 (e.g., a hard disk drive, flash memory device, etc.). In some embodiments, the wagering game controller 332 can use the current event set 338 and event history 340 to replay wagering games and/or restore interrupted wagering games. For example, the machine 306 can use the current event set 338 and event history 340 to replay wagering games in resolving player disputes, attracting players, and restoring game states after power failures.

In some embodiments, the wagering game controller 332, event handler 336, current event set 338, and event history 340 can interact and function in the manner described above (see discussion of FIG. 2). However, in other embodiments, these components can interact and function differently.

The CPU 326 is also connected to an input/output (I/O) bus 322, which facilitates communication between the wagering game machine's components. The I/O bus 322 is connected to a payout mechanism 308, primary display 310, secondary display 312, value input device 314, player input device 316, information reader 318, and wager input unit 320. The player input device 316 can include the value input device 314 to the extent the player input device 316 is used to place wagers. The I/O bus 322 is also connected to an external system interface 324, which is connected to external systems 304 (e.g., wagering game networks).

In one embodiment, the wagering game machine 306 can include additional peripheral devices and/or more than one of each component shown in FIG. 3. For example, in one embodiment, the wagering game machine 306 can include multiple external system interfaces 324 and multiple CPUs 326. In one embodiment, any of the components can be integrated or subdivided. Additionally, in one embodiment, the components of the wagering game machine 306 can be interconnected according to any suitable interconnection architecture (e.g., directly connected, hypercube, etc.). Also, the machine's components can include any data structures (e.g., queues, stacks, arrays, linked lists, etc.) suitable for performing the functionality described herein.

In one embodiment, any of the components of the wagering game machine 306 (e.g., the wagering game controller 332) can include instructions stored on machine-readable media. Machine-readable media includes any mechanism that provides (i.e., stores and/or transmits) information in a form readable by a machine (e.g., a wagering game machine, computer, etc.). For example, tangible machine-readable media includes semiconductor read only memory (ROM), semiconductor random access memory (RAM), magnetic storage media, optical storage media, flash memory devices, etc. Machine-readable media also includes any media suitable for transmitting software over a network.

This section continues with a discussion of embodiments that remotely store the current event set and event history.

Figure 4:
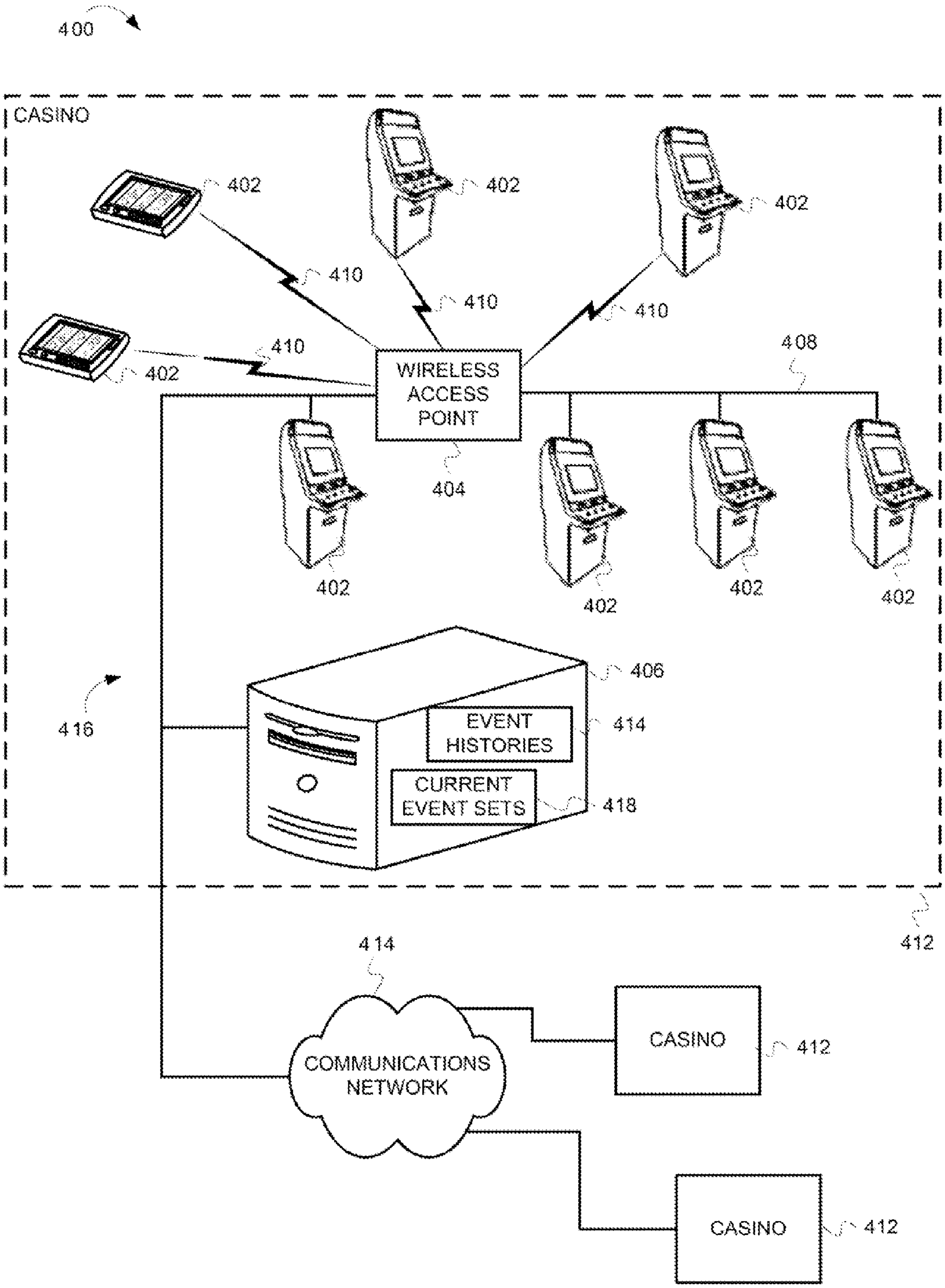
FIG. 4 is a block diagram illustrating a wagering game network in which current event sets and event histories are stored separately from wagering game machines, according to example embodiments of the invention.

FIG. 4 is a block diagram illustrating a wagering game network in which current event sets and event histories are stored separately from wagering game machines, according to example embodiments of the invention. As shown in FIG. 4, the wagering game network 400 includes a plurality of casinos 412 connected to a communications network 414.

Each of the plurality of casinos 412 includes a local area network 416, which includes a wireless access point 404, wagering game machines 402, and a wagering game server 406. The wagering game server 406 can serve wagering game over the local area network 416 to the wagering game machines 402. The wagering game server 406 includes current event sets 418 and event histories 414, which can include any number of prior event sets, like those described with reference to FIG. 2. Although not shown, the wagering game machines 402 can include event managers and wagering game controllers, like those described with reference to FIG. 2. In some embodiments, the wagering game machines 402 can use the event histories 414 and current event sets 418 to replay wagering games and restore interrupted wagering games.

The local area network 416 includes wireless communication links 410 and wired communication links 408. The wired and wireless communication links can employ any suitable connection technology, such as Bluetooth, 802.11, Ethernet, public switched telephone networks, SONET, etc. In one embodiment, the wagering game server 406 can serve wagering games and/or distribute content to devices located in other casinos 412 or at other locations on the communications network 414.

The wagering game machines 402 described herein can take any suitable form, such as floor standing models, handheld mobile units, bartop models, workstation-type console models, etc. Further, the wagering game machines 402 can be primarily dedicated for use in conducting wagering games, or can include non-dedicated devices, such as mobile phones, personal digital assistants, personal computers, etc. In one embodiment, the wagering game network 400 can include other network devices, such as accounting servers, wide area progressive servers, player tracking servers, and/or other devices suitable for use in connection with embodiments of the invention.

Operations

This section describes operations performed by embodiments of the invention. In the discussion below, the flow diagrams will be described with reference to the block diagrams presented above. In certain embodiments, the operations are performed by executing instructions residing on machine-readable media (e.g., software), while in other embodiments, the operations are performed by hardware and/or other logic (e.g., firmware). In some embodiments, the operations are performed in series, while in other embodiments, one or more of the operations can be performed in parallel.

This section begins with a discussion of embodiments that use events for restoring interrupted game states and conducting wagering games.

Figure 5:
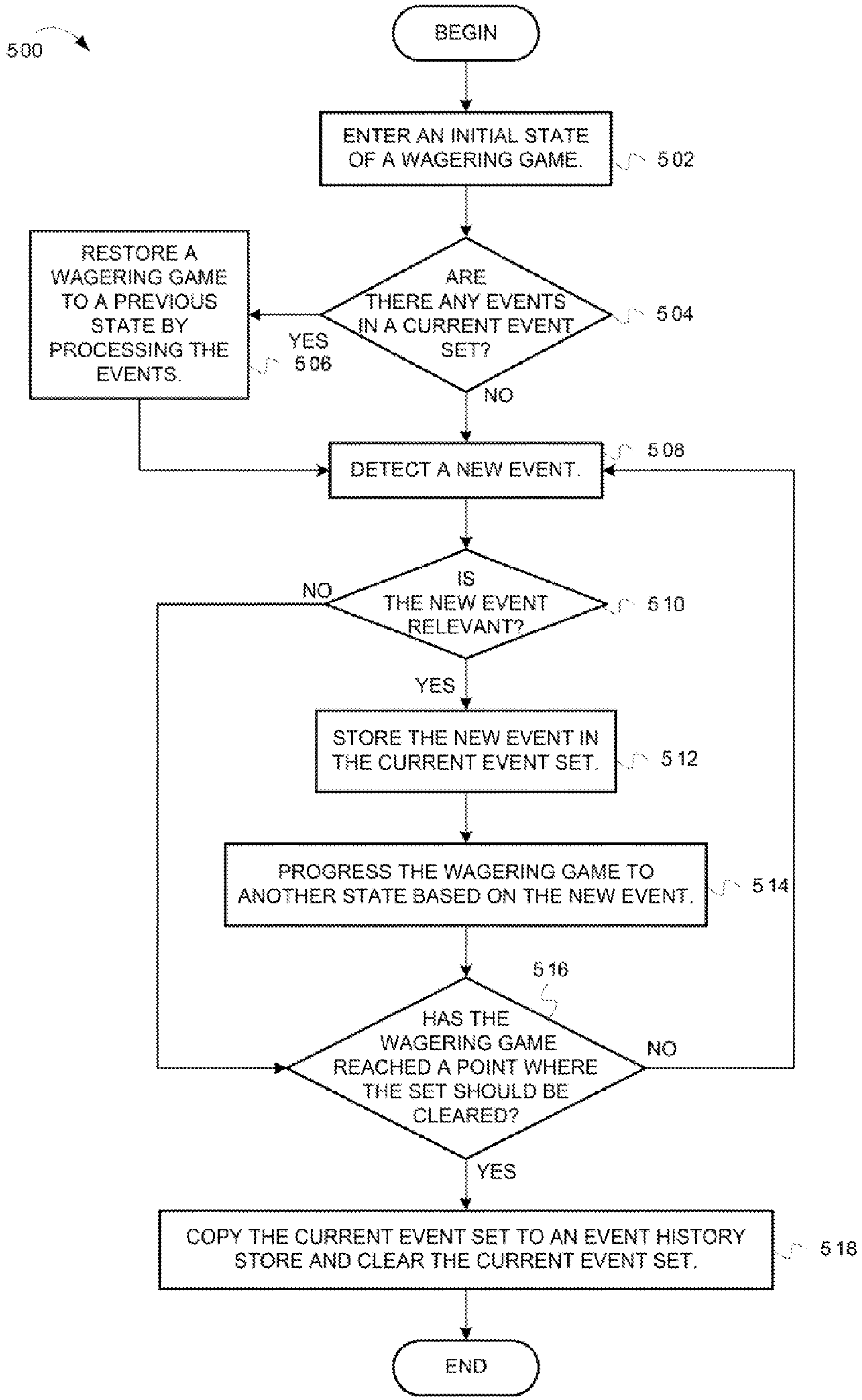
FIG. 5 is a flow diagram illustrating operations for restoring wagering game states and presenting wagering games, according to example embodiments of the invention.

FIG. 5 is a flow diagram illustrating operations for restoring wagering game states and conducting wagering games, according to example embodiments of the invention. The flow diagram 500 begins at block 502.

At block 502, an initial state is entered. For example, the controller 208 enters an initial state in which it is ready to conduct a wagering game. In one embodiment, the controller 208 enters the initial state as a result of the machine 216 powering up. The flow continues at block 504.

At block 504, a determination is made about whether there are any events in a current event set. For example, the event manager 202 determines whether there are any events in the current event set 204. In some embodiments, the event set may be stored remotely.

In some embodiments, if there are events in the current event set 204 just after entering the initial state, a wagering game was interrupted before completion. Wagering games may be interrupted by power loss, hardware failure, or other anomalies. Because the current event set 204 can persistently store events, a record of a wagering game's events should remain despite any power loss. If there are events stored in the current event set, the flow continues at block 506. Otherwise, the flow continues at block 508.

At block 506, a wagering game is restored to a previous state by processing events in the current event set. For example, the event manager 202 provides the controller 208 with events stored in the current event set 204. In turn, the controller 208 can restore the state of an interrupted wagering game by processing the events. When restoring the state, the controller 208 may not present media associated with some of the events. The flow continues at block 508.

At block 508, a new event is detected. For example, once the wagering game has been restored, the event manager 202 detects an new event, such as input from an I/O device, information from a peripheral device (e.g., a card reader or bill validator), information generated from components of the machine 216 (e.g., random number generator), or information received from components outside the machine 216 (e.g., the wagering game server 406). The flow continues at block 510.

At block 510, a determination is made about whether the new event is relevant. For example, the event manager 202 determines whether the event is relevant to the wagering game. For example, when players touch a touchscreen outside defined input areas, the touchscreen may generate events that are not relevant to the wagering game. Because embodiments of the event manager 220 can filter events (i.e., determine their relevance), the machine 216 can avoid allocating storage and processing resources to irrelevant events. In one embodiment, if the new event is not on a list of relevant events, the event manager 202 considers the event to be irrelevant. If the new event is relevant, the flow continues at block 512. Otherwise, the flow continues at block 516.

At block 512, the new event is stored in the current event store. For example, the event manager 202 stores the new event locally in the current event set 204 or remotely in the current event sets 418. The flow continues at block 514.

At block 514, based on the new event, the wagering game progresses to another state. In one embodiment, the wagering game controller 208 advances the wagering game to another state by processing the new event. Processing the events can advance a wagering game through numerous states, such as states at which wagers are accepted to states at which game results are determined and presented. For example, if the new event is a "bet one" button-press, the controller 208 can advance the game by updating credit and wager meters. If the new event is a "spin reels" button-press for a slots game, the controller 208 can spin video or mechanical reels. Other embodiments can advance the wagering game between states in any suitable manner. The flow continues at block 516.

At block 516, a determination is made about whether the wagering game has reached a point at which the current event set should be cleared. For example, the event manager 202 determines whether it has reached a point at which the current event set should be cleared. In one embodiment, the current event set 204 should be cleared after presenting final game results and paying-out wagers. If the wagering game has reached a point at which the current event set should be cleared, the flow continues at block 518. Otherwise, the flow continues at block 508.

At block 518, the current event set is copied to an event history and deleted. For example, the event manager 202 copies the contents of the current event set 204 to a prior event set 210 in the event history 206. Additionally, the event manager 202 deletes the contents of the current event set 204. In another embodiment, the wagering game server 406 copies one of the current event sets 418 to the event histories 414; it can also delete the relevant current event set 418. From block 518, the flow ends.

While FIG. 5 describes conducting and restoring wagering games, this section continues with a discussion about replaying wagering games.

Figure 6:
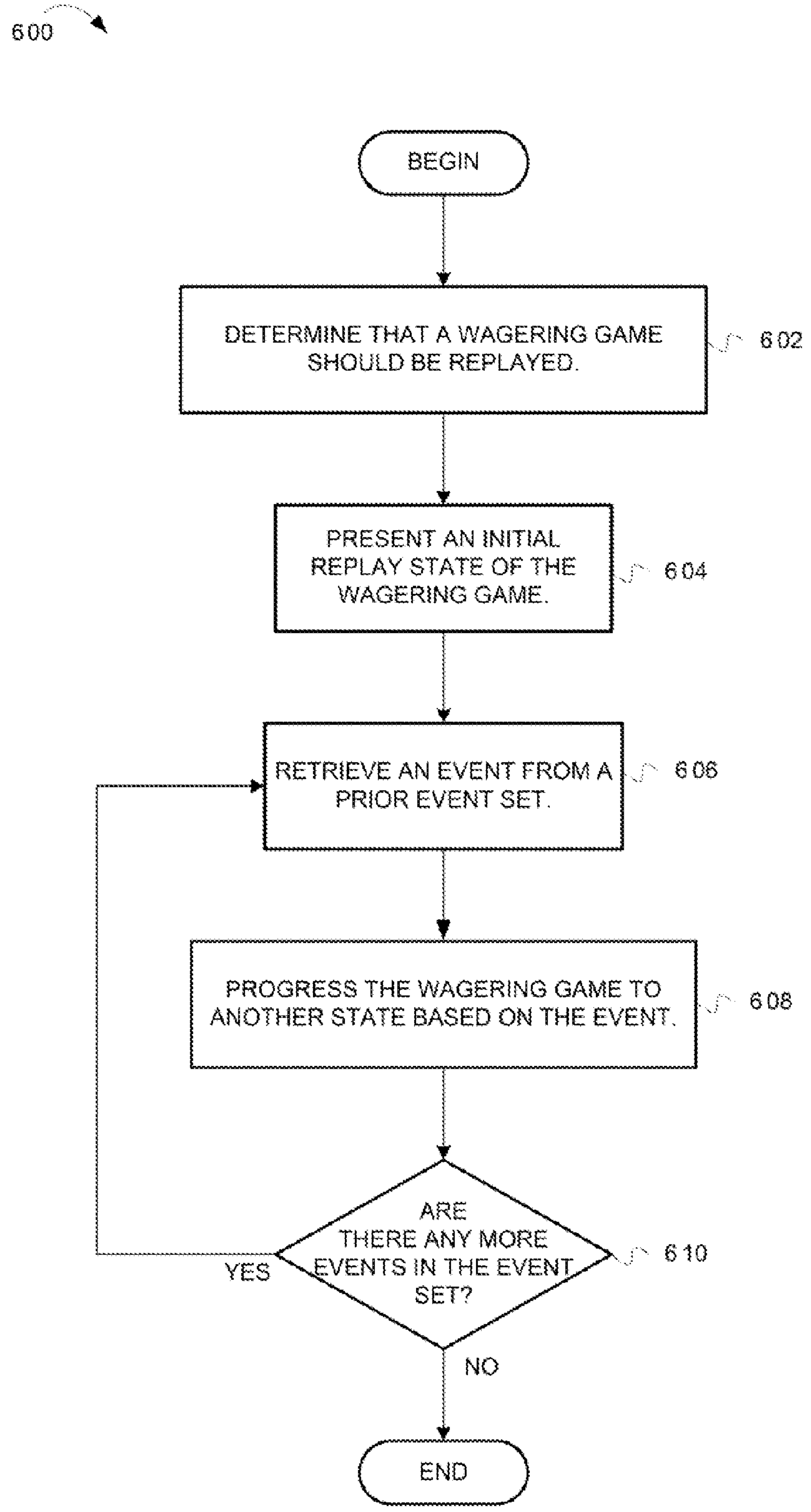
FIG. 6 is a flow diagram illustrating operations for replaying the wagering game, according to example embodiments of the invention.

FIG. 6 is a flow diagram illustrating operations for replaying a wagering game, according to example embodiments of the invention. The flow diagram 600 begins at block 602.

At block 602, it is determined that a wagering game should be replayed. In one embodiment, the event manager 202 receives a replay signal from the replay unit 218 and therefore determines that a wagering game should be replayed. The replay unit 218 can instruct the event manager 202 to replay wagering games as part of an attract mode presentation, in response to commands received from a replay interface (described below), or for any other suitable reason. The flow continues at block 604.

Figure 7:
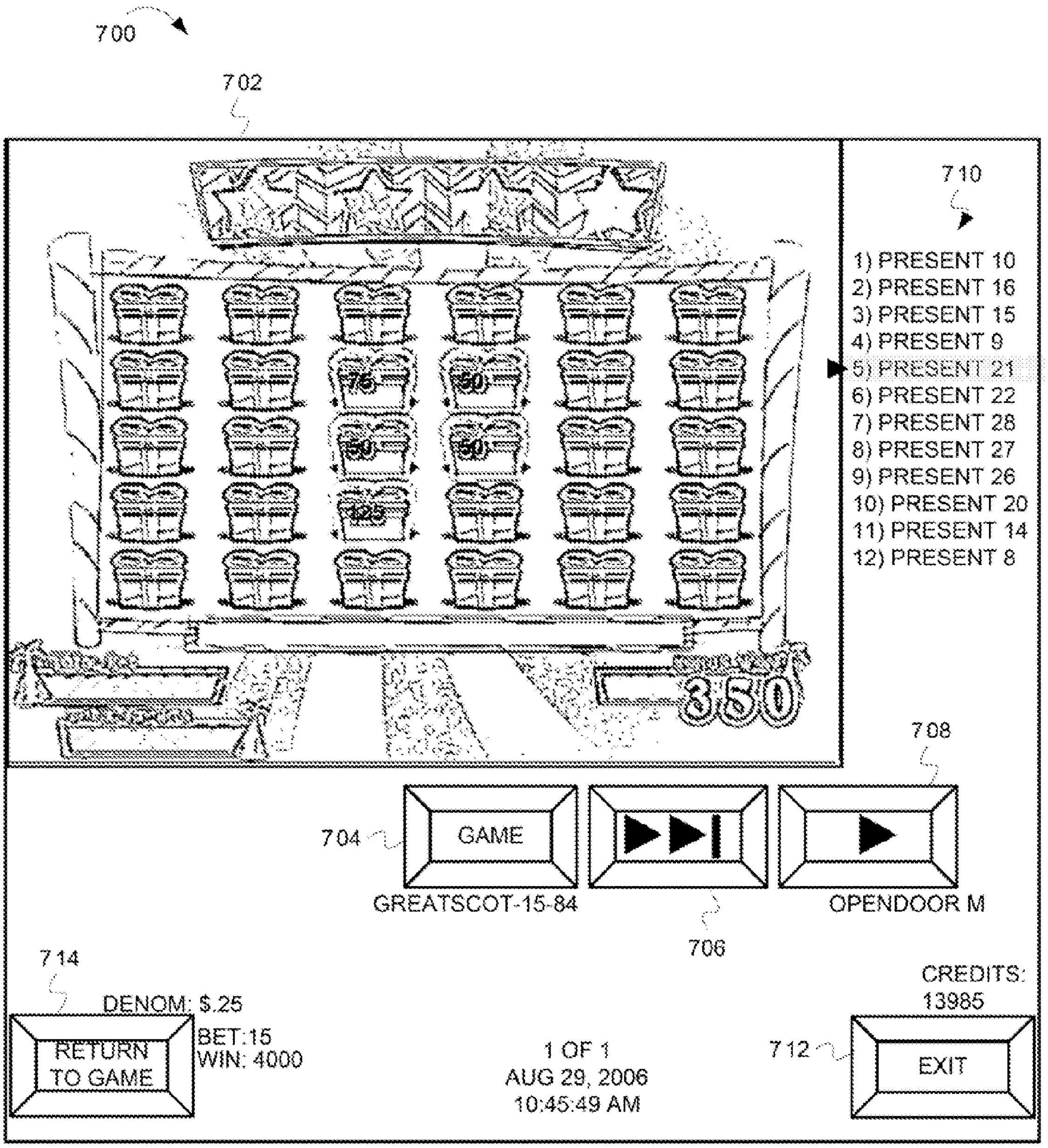
FIG. 7 is a block diagram of a replay interface through which a wagering game can be replayed on a wagering game machine, according to example embodiments of the invention.

At block 604, an initial replay state of the wagering game is presented. For example, the wagering game controller 208 presents the wagering game's initial state as pan of a replay interface. FIG. 7 shows one embodiment of a replay interface.

FIG. 7 is a block diagram of a replay interface through which a wagering game can be replayed on a wagering game machine, according to example embodiments of the invention. In FIG. 7, the replay interface 700 includes a replay area 702, state log 710, and various virtual buttons 704, 708, 710, & 714 for controlling how wagering games are replayed.

In one embodiment, when the controller 208 replays a game, it resizes the original animation to fit in the replay area 702. Although the controller 208 may resize the animation, it can use the same logic and game art for replaying games as it uses for conducting games. As a result, some embodiments do not need extra art/media files to replay games.

Turning back to FIG. 6, the flow continues at block 606.

At block 606, an event is retrieved from a prior event set. For example, the event manager 202 retrieves an event from a prior event set 210 associated with the game being replayed. Alternatively, the event manager 204 can request an event from a remote wagering game server. In some embodiments, the event manager 204 can procure all the events associated with the wagering game at once. These embodiments need not revisit block 606. The flow continues at block 608.

At block 608, based on the event, the wagering game is moved to another state. In one embodiment, the event manager 202 passes the event to the controller 208 for processing. Based on the event, the controller 208 performs operations that advance the wagering game to another state. Wagering game states reflect events and operations performed in response to the events. For example, the states can indicate wager amounts, positioning of game elements (e.g., slots reels), game element combinations (e.g., cards in a poker hand), player selections (e.g., game tokens selected in a bonus event), etc. The controller 208 can present media content as game progresses between states. In one embodiment, the controller 208 presents video content in the replay area 702 of the replay interface 700 (see FIG. 7). The flow 600 continues at block 610.

At block 610, a determination is made about whether there are more events in the prior event set. For example, the event manager 202 determines whether there are more events in the prior event set 210. If there are more events, the flow continues at block 606. Otherwise the flow ends.

During replays, as the controller 208 processes more events, it can continue displaying video content in the replay area 702. In one embodiment, the replay interface 700 facilitates numerous replay features. For example, the replay interface 700 allows administrators to replay a game's audio and video content at the speed it was originally presented. The replay interface 700 also enables administrators to replay the audio and video content at different speeds (i.e., faster or slower than the original presentation). Some embodiments of the replay interface 700 enable administrators to pause, fast forward, and rewind media during game replays. Other embodiments enable administrators to step through states, showing screenshots or animation snippets for each state. Some embodiments also allow administrators to select replay break points (i.e., states at which a replay will halt). After games are replayed, embodiments can switch back to an interface through which players can play wagering games.

While some embodiments may utilize a replay interface, embodiments can also replay games as they were originally presented. For example, some embodiments can replay games at original scale and speed in a top box, as part of attract-mode media presentations. Furthermore, embodiments can incorporate wagering game replays into bonus games, community games, and other wagering games.

Data Mining

In some embodiments, wagering game machines or other administrative devices can include logic for analyzing event histories. Some embodiments can analyze event histories for just one machine, while others can analyze event information across a plurality of machines. Event history analyses can include statistical analysis of events across numerous games and machines. The analysis can reveal how often events occur, event patterns, player habits, etc.

The event analysis can be used to optimize interfaces, game layouts, or any other aspect of a wagering game or wagering game machine. For example, an event history analysis may reveal that when certain animations are shown on a touchscreen, players often begin entering input through the touchscreen, instead of entering input using buttons on a button panel. If game designers want to stimulate more touchscreen input, they may consider showing the animations more frequently. Results from event history analyses can be used in any suitable manner.

Wagering Game Machines

This section describes addition details of wagering game machines in which embodiments of the invention can be practiced.

Figure 8:
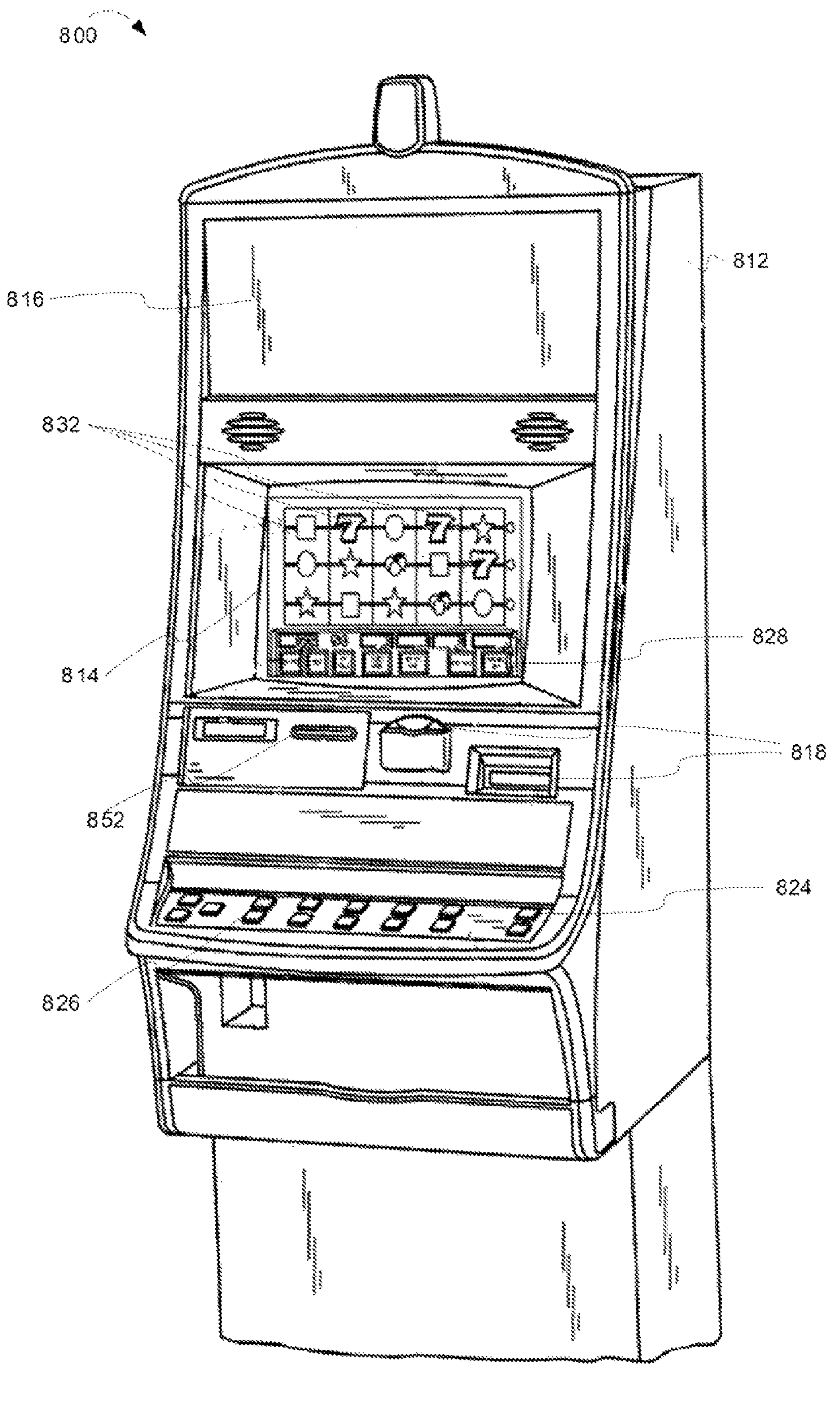
FIG. 8 is a perspective view of a wagering game machine, according to example embodiments of the invention.

FIG. 8 is a perspective view of a wagering game machine, according to example embodiments of the invention. Referring to FIG. 8, a wagering game machine 800 is used in gaming establishments, such as casinos. According to embodiments, the wagering game machine 800 can be any type of wagering game machine and can have varying structures and methods of operation. For example, the wagering game machine 800 can be an electromechanical wagering game machine configured to play mechanical slots, or it can be an electronic wagering game machine configured to play video casino games, such as blackjack, slots, keno, poker, blackjack, roulette, etc.

The wagering game machine 800 comprises a housing 812 and includes input devices, including value input devices 818 and a player input device 824. For output, the wagering game machine 800 includes a primary display 814 for displaying information about a basic wagering game. The primary display 814 can also display information about a bonus wagering game and a progressive wagering game. The wagering game machine 800 also includes a secondary display 816 for displaying wagering game events, wagering game outcomes, and/or signage information. While some components of the wagering game machine 800 are described herein, numerous other elements can exist and can be used in any number or combination to create varying forms of the wagering game machine 800.

The value input devices 818 can take any suitable form and can be located on the front of the housing 812. The value input devices 818 can receive currency and/or credits inserted by a player. The value input devices 818 can include coin acceptors for receiving coin currency and bill acceptors for receiving paper currency. Furthermore, the value input devices 818 can include ticket readers or barcode scanners for reading information stored on vouchers, cards, or other tangible portable storage devices. The vouchers or cards can authorize access to central accounts, which can transfer money to the wagering game machine 800.

The player input device 824 comprises a plurality of push buttons on a button panel 826 for operating the wagering game machine 800. In addition, or alternatively, the player input device 824 can comprise a touch screen 828 mounted over the primary display 814 and/or secondary display 816.

The various components of the wagering game machine 800 can be connected directly to, or contained within, the housing 812. Alternatively, some of the wagering game machine's components can be located outside of the housing 812, while being communicatively coupled with the wagering game machine 800 using any suitable wired or wireless communication technology.

The operation of the basic wagering game can be displayed to the player on the primary display 814. The primary display 814 can also display a bonus game associated with the basic wagering game. The primary display 814 can include a cathode ray tube (CRT), a high resolution liquid crystal display (LCD), a plasma display, light emitting diodes (LEDs), or any other type of display suitable for use in the wagering game machine 800. Alternatively, the primary display 814 can include a number of mechanical reels to display the outcome. In FIG. 8, the wagering game machine 800 is an "upright" version in which the primary display 814 is oriented vertically relative to the player. Alternatively, the wagering game machine can be a "slant-top" version in which the primary display 814 is slanted at about a thirty-degree angle toward the player of the wagering game machine 800. In yet another embodiment, the wagering game machine 800 can exhibit any suitable form factor, such as a free standing model, bartop model, mobile handheld model, or workstation console model.

A player begins playing a basic wagering game by making a wager via die value input device 818. The player can initiate play by using the player input device's buttons or touch screen 828. The basic game can include arranging a plurality of symbols along a payline 832, which indicates one or more outcomes of the basic game. Such outcomes can be randomly selected in response to player input. At least one of the outcomes, which can include any variation or combination of symbols, can trigger a bonus game.

In some embodiments, the wagering game machine 800 can also include an information reader 852, which can include a card reader, ticket reader, bar code scanner, RFID transceiver, or computer readable storage medium interface. In some embodiments, the information reader 852 can be used to award complimentary services, restore game assets, track player habits, etc.

General

In the following detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. The following detailed description does not, therefore, limit embodiments of the invention, which are defined only by the appended claims.

Each of the embodiments described herein are contemplated as falling within the inventive subject matter, which is set forth in the following claims.

The invention claimed is:

1. A wagering game machine comprising:

a plurality of input devices configured to generate some of a plurality of events associated with a wagering game;

an event handler configured to detect the plurality of events, cause persistent storage of the events, transmit the events before and after an interruption of the wagering game, transmit the events after conclusion of the wagering game; and a wagering game controller configured to receive certain of the events from the event handler before the interruption, present, based on the events received before the interruption, a portion of the wagering game before the interruption, restore, after the interruption, the wagering game based on the events received before and after the interruption, and present, after restoration of the wagering game, final results for the wagering game replay the wagering game using the events transmitted after the conclusion of the wagering game.

2. The wagering game machine of claim 1, wherein the events represent one or more of player input, intermediate results for the wagering game, and final results for the wagering game.

3. The wagering game machine of claim 1, wherein the event handler includes a current event store configured to store the plurality of events before the conclusion of the wagering game.

4. The wagering game machine of claim 1, wherein the interruption arises from a power failure.

5. The wagering game machine of claim 1, wherein the events are also remotely stored separate from the wagering game machine.

6. The wagering game machine of claim 1, wherein the event handler is further configured to ignore events not relevant to the wagering game.

7. The wagering game machine of claim 3, wherein the event handler is further configured to copy, after the conclusion of the wagering game, the events from the current event store to an event history and to delete the events from the current event store.

8. A method comprising:

entering, after an interruption, a first state of a wagering game in a wagering game machine;

detecting, in the wagering game machine, events associated with the wagering game, wherein the events were stored before the interruption;

restoring, by a wagering game controller in the wagering game machine, the wagering game to a second state by processing the events that were stored before the interruption;

detecting, after the interruption, new events associated with the wagering game;

progressing, by the wagering game controller, the wagering game to other states based on the new events;

presenting indicia associated with the other states;

presenting, by the wagering game controller, a replay of the wager game after conclusion of the wagering game, wherein the presenting the replay includes, processing, by the wagering game controller, the events stored before the interruption and the new events, and presenting indicia associated with the first state and the indicia associated with the other states.

9. The method of claim 8, wherein the events include one or more of a button press indication, a touchscreen indication, a coin input, a dollar input, a card reader input, a random number generation, and a calculation.

10. The method of claim 8, wherein the events are stored in persistent storage.

11. The method of claim 8, wherein the interruption is a power recovery operation.

12. The method of claim 8, wherein the second state is a state during which the interruption occurred.

13. The method of claim 8, further comprising:

determining that the wagering game has concluded; and storing the events in association with concluded wagering games.

14. The method of claim 8, further comprising:

determining that the wagering game has concluded; and disassociating the events from the wagering game.

* * * * *